(12) United States Patent
Huang

(10) Patent No.: US 7,418,618 B2
(45) Date of Patent: Aug. 26, 2008

(54) ERROR REPORTING AND CORRECTING METHOD FOR PERIPHERAL

(75) Inventor: Wen-Yung Huang, Miaoli (TW)

(73) Assignee: Transpacific IP Ltd., Taipei (TW)

( * ) Notice: Subject to any disclaimer, the term of this patent is extended or adjusted under 35 U.S.C. 154(b) by 450 days.

(21) Appl. No.: 10/248,310

(22) Filed: Jan. 8, 2003

(65) Prior Publication Data

US 2004/0153690 A1    Aug. 5, 2004

(51) Int. Cl.
*G06F 11/00* (2006.01)

(52) U.S. Cl. .................. 714/2; 714/3; 714/5; 714/7; 714/56

(58) Field of Classification Search .................. 714/2, 714/3, 5, 7, 56
See application file for complete search history.

(56) References Cited

U.S. PATENT DOCUMENTS

| | | | | |
|---|---|---|---|---|
| 5,794,032 | A * | 8/1998 | Leyda | 714/5 |
| 6,513,076 | B1 * | 1/2003 | Chen | 714/5 |
| 6,732,195 | B1 * | 5/2004 | Baldwin | 710/6 |
| 2001/0003827 | A1 * | 6/2001 | Shimamura | 709/206 |
| 2003/0023770 | A1 * | 1/2003 | Barmettler et al. | 709/327 |
| 2003/0154425 | A1 * | 8/2003 | Kim | 714/25 |

* cited by examiner

*Primary Examiner*—Robert W Beausoliel, Jr.
*Assistant Examiner*—Joseph D Manoskey
(74) *Attorney, Agent, or Firm*—Stolowitz Ford Cowger LLP

(57) ABSTRACT

An error reporting and correcting method applied to a peripheral. The peripheral can be connected to the user terminal via the network. In the error reporting and correcting method, an error record file is generated immediately after an error operation occurs to the peripheral. The error record file is uploaded via the network by the user host, and a correction program corresponding to the error file is downloaded to the user host via the network. After being downloaded, the correction program for automatically performing error correction is automatically installed in the user host.

37 Claims, 3 Drawing Sheets

ERROR REPORTING AND CORRECTING METHOD FOR PERIPHERAL

BACKGROUND OF INVENTION

1. Field of the Invention

The invention relates in general to an error reporting and correcting method applied to a peripheral, and more particularly, to a method applicable to automatically report and correct errors occurring to peripherals, which then can be operated normally.

2. Related Art of the Invention

Peripherals, including scanners, printers, and CD-ROM's employed in the user hosts have become necessary appliances for offices. When errors occur to the peripherals, the users are normally unaware of the reasons causing such errors. Therefore, telephones inquiries or electronic mails are typically used for contacting the customer service of the providers. Very often the customer service cannot resolve the problem immediately and has to transfer such issues to other related people. This method is very restrictive.

Another more convenient method to resolve the above problems is to automatically inquire whether the user needs to update the application software or driver program. Or alternatively, the user may log on the website of the provider to download the updated software or program. However, the updated program is often designed as an overall correction instead of a revision designed for the specific errors occurring to the peripheral. Further, the downloading process is normally very time consuming and very often unavailable because of a network jam.

SUMMARY OF INVENTION

The present invention provides an error reporting and correcting method applied to a peripheral. Only when operation errors occur to the peripheral, and the correcting message appears is the correcting program downloaded, such that the peripheral can returns to normal operation process. Therefore, the time spent on correcting the error is reduced, and the network flow will not be stopped by such correction.

The peripheral is connected to the user host via a network. The error reporting and correcting method of the peripheral includes generating an error record file immediately after an error operation occurs to the peripheral. The error record file is uploaded via the network from the user host. A correcting program related to such error record file is then downloaded to the user host. After being downloaded, the correcting program for error correction can be automatically installed in the user host.

In one preferred embodiment, this method includes several inquiry steps, such as an inquiry whether the error record file is to be uploaded, whether the correcting program is to be downloaded, and whether the correcting program is to be installed. When the user agrees with all these inquiries, the above steps are performed.

Preferably, the method further comprises detecting whether the error record file is generated or not. The error record file will only be uploaded after the generation thereof.

The present invention further comprises an error reporting and correcting method applied to a peripheral to resolve an error operation of the peripheral caused by hardware or software.

When the error operation of the peripheral is enabled by the hardware, processing steps include generating an error code as an index to compare with a message table. The correction message corresponding to the error code is thus obtained from the message table. The correction message is then displayed on the screen of the user host, allowing the user to check for the reason causing such an error in the correction process steps.

When the error operation of the peripheral is enabled by the software, the process includes generating an error record file. While being detected, the error record file is uploaded, followed by downloading a correcting program corresponding to the error record file. The correcting program for correcting the error operation is then automatically installed.

In the above process steps, the process steps for the errors caused by hardware may be superior to those for the errors caused by software. Or alternatively, the process steps for the errors caused by software may be superior to those for the errors caused by hardware. The process steps for the errors caused by both software and hardware can be executed together. The user may then decide whether the correction operation is performed or not.

Accordingly, the present invention displays a correction message when operation errors of the peripheral are caused by the hardware, such that the user may obtain the existence of the errors and the related correction process. When the operation errors of the peripheral are caused by the software, the error correction program code in the automatic correcting software allows the peripheral to return to normal operation. Further, when the errors are caused by the software, the corresponding correcting program can be downloaded without routinely updating the program, so that the network flow is more fluent.

BRIEF DESCRIPTION OF DRAWINGS

These, as well as other features of the present invention, will become more apparent upon reference to the drawings wherein.

DETAILED DESCRIPTION

Figure 1:
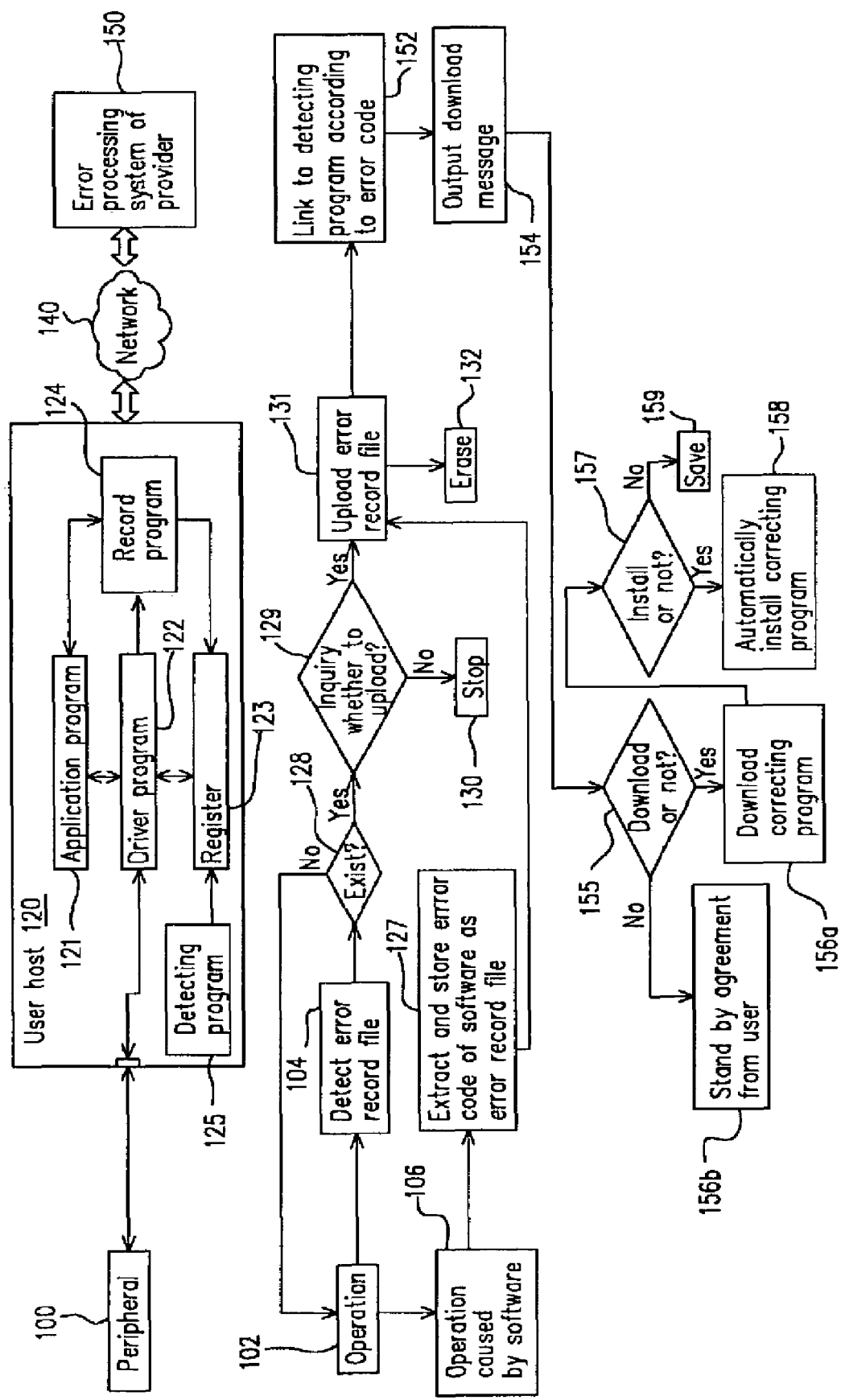
FIG. 1 is a block diagram showing an error reporting and correcting method caused by operation error of the peripheral caused by software.

Referring to FIG. 1, a preferred embodiment using the error reporting and correcting method for a peripheral according to the present invention is illustrated. The peripheral 100 includes a scanner, a printer and a CD burner which requires a driver program 122 and application software 121 connected to a user host 120 which can be linked to a network 140. In addition, the other side of the network 140 is connected to an error processing system 150 of the provider of the peripheral 100. When errors occur to the peripheral 100 at the user host 120, software (including application program 121 and driver program 122) is available to be downloaded and updated. The content of the downloaded and updated software may only include the function codes for the errors. Therefore, the time that the user spent on the network can be reduced to improve the network flow.

Being instructed by the application program 121 and driven by the driver program 122 in the step 102, the peripheral 100 starts being operated. Meanwhile, a record program 124 is downloaded in the user host 120 to continuously record operation during execution of the application program 120 and the driver program 122. In addition, an error detecting program 125 is also loaded to continuously detect whether any error record file is existent in the register file in step 104. When the error record file is not existent, the peripheral stays in operation status in step 102.

When an error operation is caused by software in the operation (step 106), the record program 124 extracts an error code in step 127 and saves the error code as a record file into the register 123. When the detecting program 125 detects the existence of the error record file in the register 123 in step 128, the user is notified by providing an error detection message immediately. Or alternatively, the user is notified after the program is terminated that error of the peripheral 100 caused by software exists. The user may also be notified that error of the peripheral 100 caused by software exists before executing the program next time.

When an error operation is caused by software in the operation (step 106), the record program 124 extracts an error code in step 127 and saves the error code as a record file into the register 123. When the detecting program 124 detects the existence of the error record file in the register 123 in step 128, the user is notified by providing an error detection message immediately. Or alternatively, the user is notified after the program is terminated that error of the peripheral 100 caused by software exists. The user may also be notified that error of the peripheral 100 caused by software exists before executing the program next time.

When the user requests to upload the error record file to the error processing system 150 of the provider in step 129, the detecting program 125 stands by until the upload operation is granted. When the upload operation is granted by the user, with the user host 120 connected to the network 140, the detecting program 125 links the address of the error processing system 150 of the provider. When the record program 124 detects that the error record file in the register 123 has been uploaded to the error processing system 150, the error record file is erased from the register 123. Alternatively, the error record file is erased when the detecting program 124 detects the upload process for the error record file.

When the error processing system 150 of the provider receives the error record file, the error code contained therein is used to determine whether the error is caused by the application program 121 or by the driver program 122. When the source causing the error is obtained, a correcting program is linked in step 152. A download request message is then output in step 154. When the user host 120 receives the request message, the user is inquired of whether the correcting program is to be downloaded in step 155. If the user disagrees with downloading the correcting program, the error processing system 150 of the provider stands by in step 156*b* for downloading agreement from the user. When the user decides to download the correcting program, the error processing system 150 uploads the correcting program allowing the user host 120 to download in step 156*a*. Similarly, after downloading the correcting program, the user is inquired whether the correcting program is to be automatically installed in step 157. When the user decides to install the correcting program, the correcting program is automatically decompressed and installed in the user host 120. Otherwise, the correcting program is saved in the user host 120.

The error caused by software (the application program 121 or driver program 122) may include that the software itself is an old version, or bugs exist in certain program code therein. Whichever reason that is, the software program is updated or corrected according to the error code.

Figure 2:
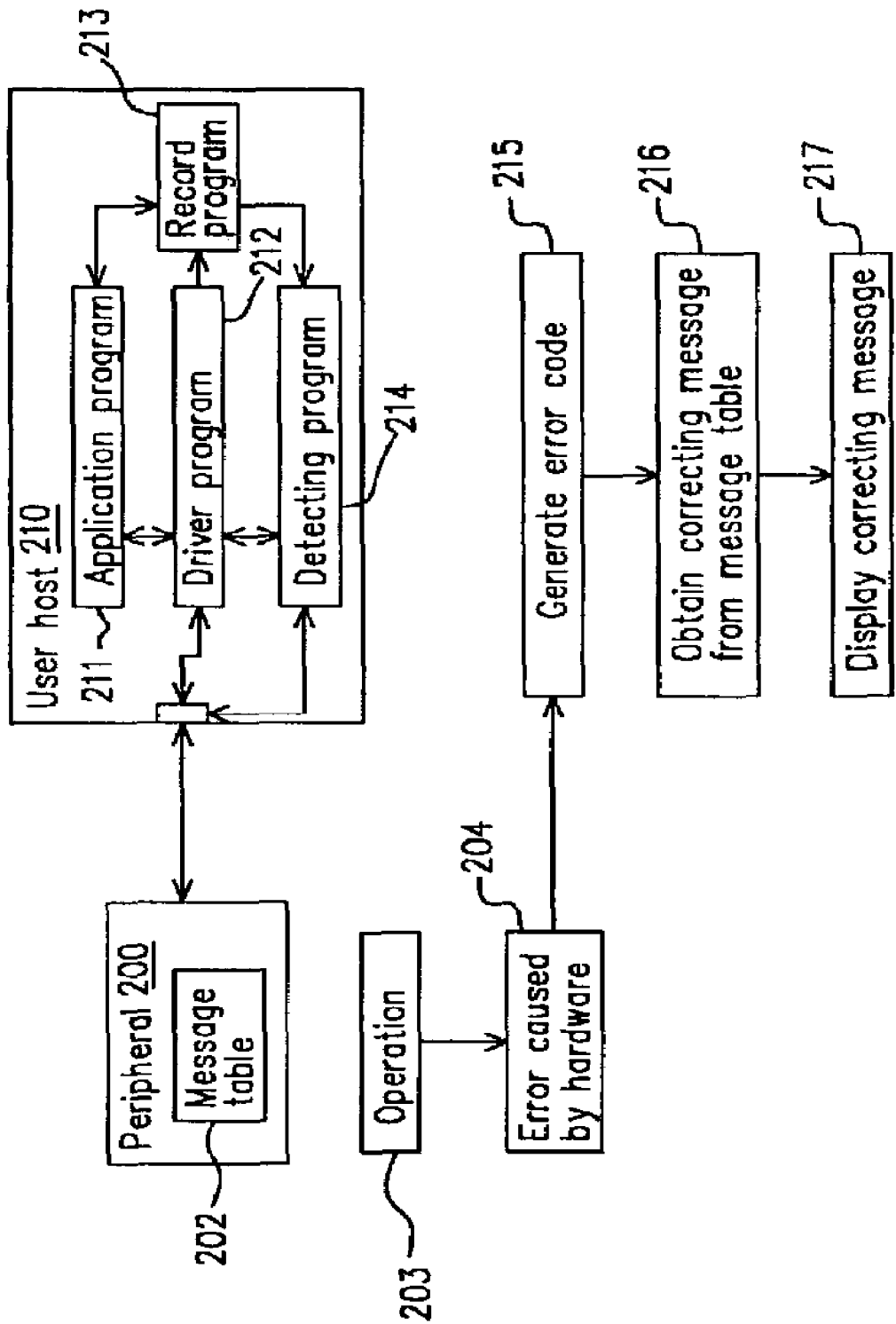
FIG. 2 show block diagram showing an error reporting and correcting method caused by operation error of the peripheral caused by hardware.

Referring to FIG. 2, an error reporting and correcting method for a peripheral device is shown. The peripheral 200 is connected to the user host 210 and includes the typical scanner, printer and CD burner that requires a driver program and application program. In this embodiment, the error is caused by hardware. In the example of a scanner, when the size of the scanned image is larger than the storage space of the user host, hardware error occurs. The hardware error is further described in detail as follows.

When the peripheral 200 is operated by the application program 211 and driven by the driver program 212, a record program 213 is downloaded in the user host 210 to continuously record the operation during execution of the application program 211 and the driver program 212. An error detecting program 214 is also downloaded to receive the error code extracted by the recording program 213, and to compare the error code to a message table 202. The message table 202 is saved as a firmware in the peripheral 200 (as shown in FIG. 2) or in the user host 210.

When error occurs after the peripheral 200 is operated at operation 203, the recording program 213 records the error code of the error at block 204 and sends the error code to the error detecting program 214 during execution of the driver program 212 in step 215. The error detecting program 214 compares the error code with the message table 202. The message table 202 includes a plurality of error code columns and a plurality of correcting message columns corresponding to the error code columns. The correcting messages saved in the correcting message columns include hardware errors and hardware correcting processes. Therefore, the correcting message related to the error code extracted by the recording program 213 can be obtained in step 216. In step 217, the correcting message is displayed in the user host. The user can then correct the peripheral according to the correcting process contained in the error message.

In the above embodiment, the processing steps for errors of the peripheral caused by software and hardware are described. The following is to describe how to determine the error is caused by software or hardware, and the steps when such error occurs.

Figure 3:
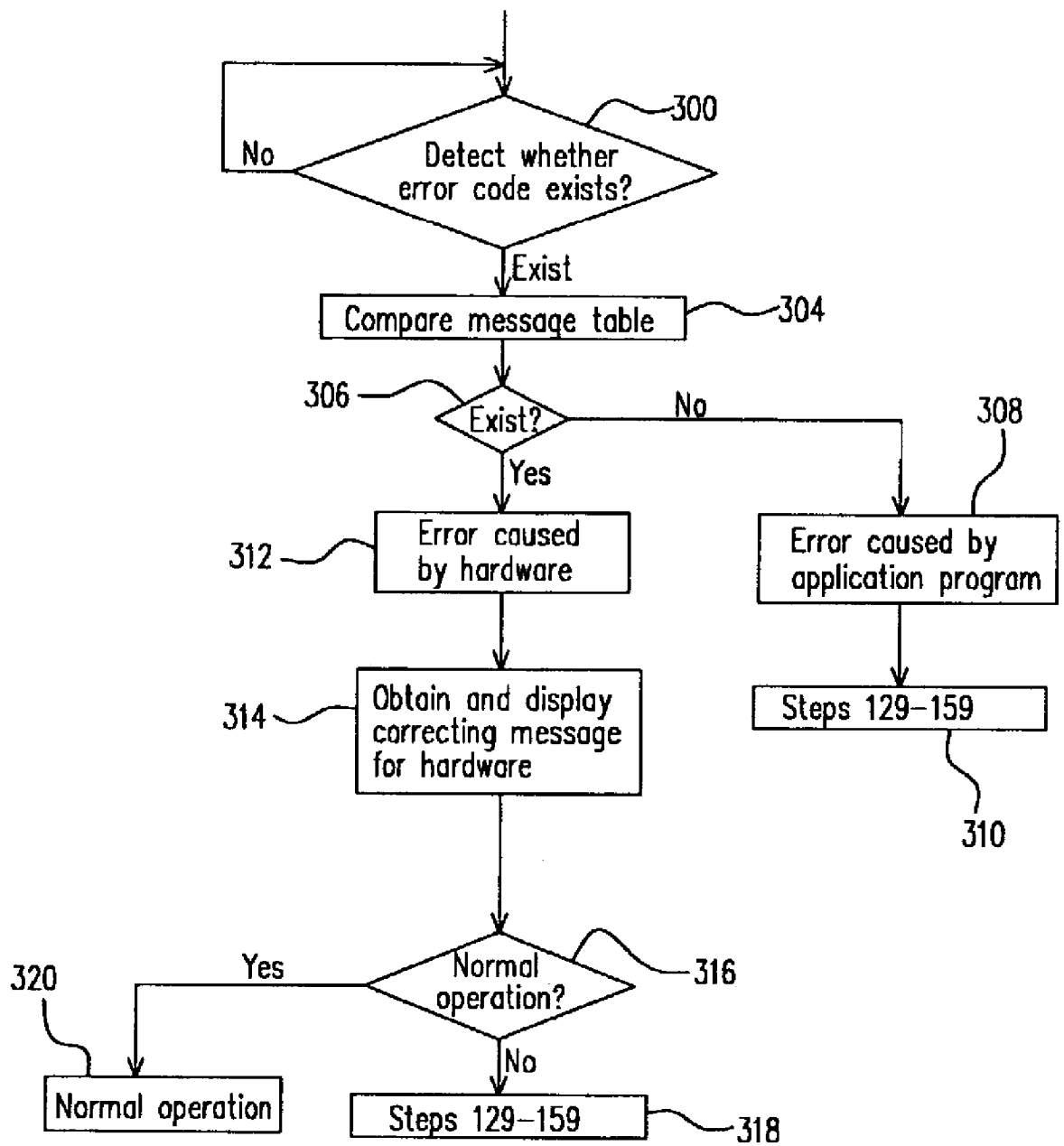
FIG. 3 shows a block diagram showing an error reporting and correcting method to determine whether error of the peripheral is caused by software or hardware.

Referring to FIG. 3, an error reporting and correcting method for a peripheral is shown. The peripheral is connected to a user host connectible to a network. At the other end of the network, an error processing system of the provider of the peripheral is connected. When errors occur to the peripheral at the user end, the provider allows the application and driver programs to be downloaded and updated by the user. The downloaded and updated content may only include function code related to the error. Therefore, the logging time can be reduced, and the network flow is more fluent.

When the peripheral is down or data process error occurs due to operation error of the peripheral, the error reporting and correcting method includes detecting of the user host whether an error code exists (step 300). If the error code is nonexistent, the error may be caused by failure of extraction or something irrelevant to the operation of the peripheral. If it is caused by failure of extraction and such failure continues, the peripheral may not be activated yet or the connection between the user host and the peripheral is not established yet.

When the error code is detected, it indicates the error code has been generated. Meanwhile, the error code is compared to the message table saved in the peripheral or the user host at step 304 to determine whether the error code exists therein at block 306. The message table is used to store a plurality of error code columns and a plurality of correcting columns corresponding to the error code columns, while reasons for causing the hardware errors and hardware correcting steps are saved in the correcting columns. As the driver program is the software driving the peripheral, the error codes of various function codes of the driver program may be the same as the error codes caused by hardware. The application program is for the high-level operation. Therefore, the function error codes of the application program will not be the same as the error codes in the message table.

In the above condition, when the error code cannot be found after comparison at step 308, it indicates that the error is caused by the application program. Therefore, the user can be inquired of whether the error code is to be uploaded, or whether the error record file is to be uploaded according to the error code. The following downloading and installing processes at steo 310 are similar to the steps 129 and 159 as shown in FIG. 1.

In the above condition, when the error code is detected in the message table at step 312, it indicates that the error is caused by either the driver program or the hardware. When the hardware correcting procedure has higher priority than that of the software for the correcting method, the correcting message is obtained from the message table and displayed in step 314. When normal operation 320 is not retrieved in step 316, it indicates such error is a driving error caused by a part of program code of the driver program. The user is again inquired of whether the error record file of the error code is to be uploaded. The following process at step 318 can be referenced to the download step 129 and install step 159 as shown in FIG. 1.

In another condition, when the error caused by software is prior to the error caused by hardware, the steps 129 and 159 may be performed in step 312 first. If normal operation 320 is not obtained in step 316, the correcting message for hardware is then obtained and displayed at the user end.

When the correcting method is designed for simultaneously executing the processing steps for the errors caused by both software and hardware, the message is displayed first allowing the user to decide whether to execute the correcting operation of the hardware or the software.

In addition, if the error code of the driver program and the error code caused by hardware do not correspond to the same, when it is found that the error code is the error code in the message table by comparing the message table in step 306, one can thus obtain the correcting message from the message table direction and show it at the user end. When it is found that the error code does not correspond to any of the code in the message table in step 306, the user is inquired of whether such error code is uploaded to the error processing system of the provider. The error processing system of the provider then determines the errors being caused by the driver program or the application program to download the corresponding correcting program.

Accordingly, the present invention has the advantages that the operation error caused by hardware or software can be detected, allowing the user to know the error location and the correcting process. Or the correcting program can be downloaded allowing the operation software to be updated. The error correcting time of the peripheral is thus reduced. As the correcting program is downloaded when the error is caused by software, the network flow is fluent with reduced log-in time.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

The invention claimed is:

1. An error reporting and correcting method for a peripheral connected to a user host linkable to a network, the method comprising:
   generating an error record file in the user host when an error operation occurs in the peripheral;
   uploading the error record file to the network in response to a comparison of a portion of said error record with a message table; and
   in response to the uploading, automatically downloading a correcting program associated with the error record file to the user host via the network.

2. The method according to claim 1, wherein the error operation comprises a software error caused by a driver program of the peripheral.

3. The method according to claim 2, wherein the error record file includes an error code of the driver program.

4. The method according to claim 3, wherein the correcting program includes functional code associated with the error code of the driver program.

5. The method according to claim 1, wherein the error operation comprises a software error caused by an application program of the peripheral.

6. The method according to claim 5, wherein the error record file includes an error code of the driver program.

7. The method according to claim 6, wherein the correcting program includes functional code associated with the error code of the driver program.

8. The method according to claim 5, wherein the correcting program provides correction for the application program.

9. The method according to claim 1, further comprising:
   determining whether the error record file is to be uploaded;
   determining whether the correcting program is to be downloaded; and
   determining whether the correcting program is to be installed.

10. The method according to claim 1, further comprising determining whether the error record file was generated.

11. The method according to claim 1, further comprising automatically installing the correcting program in the user host.

12. The method according to claim 1, further comprising:
    detecting if the portion of said error record is in the message table; and
    if the portion of said error record exists in the message table, not performing the uploading.

13. The method according to claim 12, further comprising:
    if the portion of said error record exists in the message table, displaying a corresponding message from the message table.

14. An error reporting and correcting method for a peripheral, comprising:
    generating an error code at least in part in response to a detection of an error in a peripheral;
    in response to the generating, automatically obtaining a correcting message associated with the error code from a message table stored locally with respect to the peripheral;
    if the message table has an entry for the error code, displaying the correcting message on a display of a host system communicatively coupled to the peripheral; and
    if the message table does not have an entry for the error code, processing the error as a software error.

15. The method according to claim 14, wherein the message table comprises a plurality of error code columns and a plurality of correcting message columns corresponding to the error code columns.

16. The method according to claim 14, wherein the correcting messages identify a plurality of hardware error causes and a plurality of hardware correcting steps.

17. The method according to claim 14, wherein the processing the error as a software error comprises:
uploading the error code to a network; and
in response to the uploading, automatically downloading a correcting program associated with the error code to the host system via the network.

18. A method comprising:
generating an error code at least in part in response to a detection of a software error in a peripheral;
generating an error record file based at least in part on the error code;
automatically providing the error record file to a network in response to a comparison of a portion of the error record file with a message table;
in response to the providing, automatically downloading a correcting program associated with the error record file from the network; and
utilizing the correcting program to at least partially correct the detected software error.

19. The method according to claim 18, wherein the software error comprises a software error of a driver program.

20. The method according to claim 19, wherein the correcting program includes function code generated according to an error code generated from the driver program.

21. The method according to claim 18, wherein the software error comprises an application program error.

22. The method according to claim 21, wherein the error record file includes an error code associated with the application program error.

23. The method according to claim 22, wherein the correcting program includes function code generated according to the error code.

24. The method according to claim 18, wherein the error record file is uploaded via one or more of: email, network communication, telephone and facsimile.

25. The method according to claim 18, further comprising:
determining whether the error record file is to be uploaded;
determining whether the correcting program is to be downloaded; and
determining whether the correcting program is to be installed.

26. The method according to claim 18, further comprising:
detecting whether the error code is generated; and
comparing an error table with the error code to determine whether the error code is caused by an application program.

27. The method according to claim 18, wherein the automatically providing the error record file to the network comprises uploading the error record file to the network to elicit a remote device to send back the correcting program.

28. The method according to claim 27, wherein the correcting program corresponds to the error record file.

29. An apparatus, comprising:
a computing device communicatively coupled to a peripheral, said computing device adapted to:
generate an error code at least in part in response to a detection of an error in a peripheral;
obtain a correcting message associated with the error code from a message table stored on the computing device in response to a comparison of a portion of the error record file with the message table;
if the message table has an entry associated with the error code, display the correcting message on a display coupled to the computing device; and
if the message table does not have an entry associated with the error code, process the error as a software error.

30. The apparatus of claim 29, wherein the message table comprises a plurality of error code columns and a plurality of correcting message columns associated with the error code columns.

31. The apparatus of claim 29, wherein the correcting messages include a plurality of hardware error causes and a plurality of hardware correcting steps.

32. An apparatus, comprising:
a computing device communicatively coupled to a peripheral and communicatively coupled to a network, said computing device adapted to:
generate an error code at least in part in response to a detection of an error in a peripheral;
generate an error record file based at least in part on the error code;
provide the error record file to a network in response to a comparison of a portion of the error record file with a message table;
in response to the providing, automatically download a correcting program associated with the error record file from the network; and
utilize the correcting program to at least partially correct the detected software error.

33. The apparatus of claim 32, wherein the error software error comprises a driver error, and wherein the record file includes an error code associated with a driver program.

34. The apparatus of claim 33, wherein the correcting program includes a function code generated based at least in part on the error code associated with the driver program.

35. The apparatus of claim 32, wherein the software error comprises an application program error.

36. The apparatus of claim 35, wherein the error record file includes an error code associated with the application program error.

37. The apparatus of claim 32, wherein the correcting program includes a function code generated according to the error code.

* * * * *